US010944685B2

(12) United States Patent
Conti et al.

(10) Patent No.: US 10,944,685 B2
(45) Date of Patent: Mar. 9, 2021

(54) ABSTRACTED, EXTENSIBLE CLOUD ACCESS OF RESOURCES

(71) Applicant: INTERNATIONAL BUSINESS MACHINES CORPORATION, Armonk, NY (US)

(72) Inventors: Thomas W. Conti, Poughkeepsie, NY (US); Christopher Harding, Poughkeepsie, NY (US); Paul Taukatch, Poughkeepsie, NY (US); Stephen C. Warren, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/825,918

(22) Filed: Nov. 29, 2017

(65) Prior Publication Data

US 2019/0166063 A1 May 30, 2019

(51) Int. Cl.
*H04L 29/06* (2006.01)
*H04L 29/08* (2006.01)
*H04L 12/911* (2013.01)

(52) U.S. Cl.
CPC .............. *H04L 47/70* (2013.01); *H04L 63/08* (2013.01); *H04L 63/102* (2013.01); *H04L 67/10* (2013.01)

(58) Field of Classification Search
CPC ...... G06F 17/248; G06F 21/41; G06F 16/211; H04L 47/70; H04L 67/1025;
(Continued)

(56) References Cited

U.S. PATENT DOCUMENTS 8,578,442 B1 * 11/2013 Banerjee ............. H04L 63/1441
709/204
8,631,067 B2 * 1/2014 McWhirter ............. G06F 9/541
709/203

(Continued)

FOREIGN PATENT DOCUMENTS

CN 104917815 A 9/2015

OTHER PUBLICATIONS

Pippal et al.; An Efficient Schema Shared Approach for Cloud based Multitenant Database Authentication & Authorization Framework; 2011 International Conference on P2P, Parallel, Grid, Cloud and Internet Computing; pp. 213-218 (Year: 2011).*

(Continued)

*Primary Examiner* — Tonia L Dollinger
*Assistant Examiner* — Linh T. Nguyen
(74) *Attorney, Agent, or Firm* — Cantor Colburn LLP; Teddi Maranzano

(57) ABSTRACT

A computer-implemented method includes determining how to translate between a primary schema and each of two or more native schemas of two or more cloud providers. The primary schema defines one or more access methods for accessing a plurality of cloud resources of the cloud providers. A request is received for a first cloud resource of the plurality of cloud resources, where the first cloud resource is provided remotely by a first cloud provider, and where the request complies with the primary schema. The request is converted into a translated request in compliance with a first native schema of the first cloud provider. The translated request is submitted to the first cloud provider. A response is received from the first cloud provider. The response includes a cloud resource of the plurality of resources, and the response complies with the first native schema of the cloud provider. The response is returned.

13 Claims, 5 Drawing Sheets

(58) Field of Classification Search
CPC ..... H04L 63/102; H04L 67/30; H04L 67/306; H04L 63/08; H04L 41/28; H04L 63/0815; H04L 63/101; H04L 29/06986; H04L 63/0227; H04L 9/321; H04L 63/20; H04L 63/0807; H04L 9/3226
USPC .......................... 709/226; 726/1, 2, 5, 18, 26
See application file for complete search history.

(56) References Cited

U.S. PATENT DOCUMENTS

| | | | | |
|---|---|---|---|---|
| 9,560,037 | B2 | 1/2017 | Bartz et al. | |
| 2010/0042720 | A1* | 2/2010 | Stienhans | G06F 9/5072 709/226 |
| 2010/0333031 | A1* | 12/2010 | Castelli | G06F 16/95 715/835 |
| 2011/0153727 | A1* | 6/2011 | Li | G06F 9/5055 709/203 |
| 2011/0213712 | A1* | 9/2011 | Hadar | G06Q 30/04 705/80 |
| 2013/0066940 | A1* | 3/2013 | Shao | H04L 67/1025 709/201 |
| 2014/0181301 | A1 | 1/2014 | Yendluri | |
| 2014/0108665 | A1 | 4/2014 | Arora et al. | |
| 2014/0289824 | A1* | 9/2014 | Chan | G06F 9/54 726/5 |
| 2014/0325620 | A1* | 10/2014 | Samson | G06F 9/46 726/5 |
| 2015/0081876 | A1* | 3/2015 | Pieczul | H04L 67/22 709/224 |
| 2016/0072886 | A1* | 3/2016 | Lin | G06F 16/182 709/213 |
| 2016/0292193 | A1* | 10/2016 | Madanapalli | H04L 67/1097 |
| 2017/0013021 | A1* | 1/2017 | Hoy | H04L 63/205 |
| 2017/0060911 | A1* | 3/2017 | Loscalzo | G06F 16/258 |
| 2017/0111220 | A1 | 4/2017 | Kumar et al. | |
| 2017/0223010 | A1* | 8/2017 | Wilkinson | H04L 29/06 |
| 2017/0353444 | A1* | 12/2017 | Karangutkar | H04L 29/06 |
| 2018/0007099 | A1* | 1/2018 | Ein-Gil | H04L 63/08 |
| 2018/0115551 | A1* | 4/2018 | Cole | H04L 63/10 |
| 2018/0367526 | A1* | 12/2018 | Huang | H04L 29/06 |
| 2019/0273745 | A1* | 9/2019 | Oberg | H04L 63/102 |
| 2019/0311143 | A1* | 10/2019 | Arambillet Echevarr A | G06F 21/6218 |

OTHER PUBLICATIONS

Kim et al., "Experience in Practical Implementation of Abstraction Interface for Integrated Cloud Resource Management on Multi-Clouds" KSII Transactions on Internet and Information Systems vol. 11, No. 1, Jan. 2017; pp. 18-37.

Munteanu et al., "Multi-cloud resource management: cloud service interfacing", Journal of Cloud Computing: Advances, Systems and Applications 2014, 3:3; http://www.journalofcloudcomputing.com/content/3/1/3; pp. 1-23.

Park, Hyun-A "Secure chip based encrypted search protocol in mobile office environments", International Journal of Advanced Computer Research, vol. 6(24); Received: May 11, 2016; Revised: May 20, 2016; Accepted: May 23, 2016; pp. 72-80.

Sarode et al., "The Effective and Efficient Security Services for Cloud Computing", International Journal of Computer Applications (0975-8887); vol. 34, No. 9, Nov. 2011; pp. 1-7.

Silva et al., "A common API for delivering services over multi-vendor cloud resources" The Journal of Systems and Software 86 (2013) pp. 2309-2317.

\* cited by examiner

ABSTRACTED, EXTENSIBLE CLOUD ACCESS OF RESOURCES

BACKGROUND

The present invention relates to cloud access and, more specifically, to abstracted and extensible cloud access of resources.

Cloud storage is the storage of data remotely on servers managed by a cloud provider, and cloud services are services provided remotely by a cloud provider. Cloud services include providing access to remote resources, such as cloud storage, remote hardware, and tasks performed remotely. Cloud services have become popular, in part, because they enable users to access resources without having to store or manage support for those resources locally. Thus, users can access more resources than they could if limited to a local machine. Due to the usefulness and popularity of cloud services, many cloud providers exist, and often a user will utilize cloud services of multiple cloud providers. This requires the user to authenticate himself to each cloud provider separately and to use a different interface to access the cloud services of each cloud provider.

SUMMARY

Embodiments of the present invention are directed to a computer-implemented method for accessing cloud resources. A non-limiting example of the computer-implemented method includes determining, by a computer processor, how to translate between a primary schema and each of two or more native schemas of two or more cloud providers. The primary schema defines one or more access methods for accessing a plurality of cloud resources of the two or more cloud providers. A request is received for a first cloud resource of the plurality of cloud resources, where the first cloud resource is provided remotely by a first cloud provider of the two or more cloud providers, and where the request complies with the primary schema. The request is converted into a translated request in compliance with a first native schema of the first cloud provider. The translated request is submitted to the first cloud provider. A response is received from the first cloud provider. The response includes a cloud resource of the plurality of resources, and the response complies with the first native schema of the cloud provider. The response is returned.

Embodiments of the present invention are directed to a system for accessing cloud resources. A non-limiting example of the system includes a memory having computer-readable instructions and one or more processors for executing the computer-readable instructions. The computer-readable instructions include determining how to translate between a primary schema and each of two or more native schemas of two or more cloud providers. The primary schema defines one or more access methods for accessing a plurality of cloud resources of the two or more cloud providers. Further according to the computer-readable instructions, a request is received for a first cloud resource of the plurality of cloud resources, where the first cloud resource is provided remotely by a first cloud provider of the two or more cloud providers, and where the request complies with the primary schema. The request is converted into a translated request in compliance with a first native schema of the first cloud provider. The translated request is submitted to the first cloud provider. A response is received from the first cloud provider. The response includes a cloud resource of the plurality of resources, and the response complies with the first native schema of the cloud provider. The response is returned.

Embodiments of the invention are directed to a computer-program product for accessing cloud resources, the computer-program product comprising a computer-readable storage medium having program instructions embodied therewith. The program instructions are executable by a processor to cause the processor to perform a method. A non-limiting example of the method includes determining how to translate between a primary schema and each of two or more native schemas of two or more cloud providers. The primary schema defines one or more access methods for accessing a plurality of cloud resources of the two or more cloud providers. Further according to the method, a request is received for a first cloud resource of the plurality of cloud resources, where the first cloud resource is provided remotely by a first cloud provider of the two or more cloud providers, and where the request complies with the primary schema. The request is converted into a translated request in compliance with a first native schema of the first cloud provider. The translated request is submitted to the first cloud provider. A response is received from the first cloud provider. The response includes a cloud resource of the plurality of resources, and the response complies with the first native schema of the cloud provider. The response is returned.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
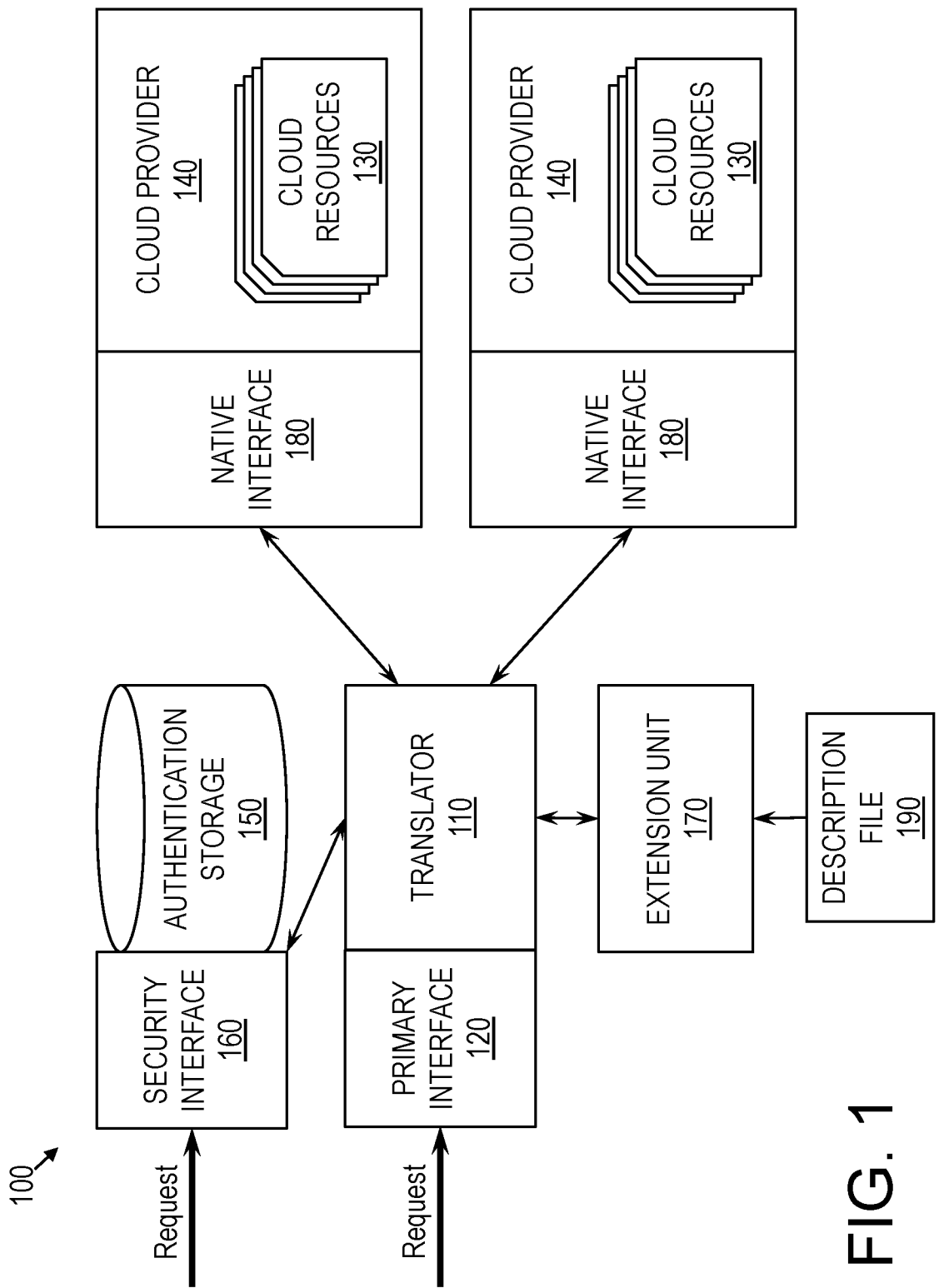
FIG. 1 is a block diagram of an access system, according to some embodiments of this invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the use of cloud services can be inconvenient and inefficient because each cloud provider requires its own interface. Thus, to use multiple cloud providers, a user must remember authentication information for each such cloud provider, and must be skilled in the use of various interfaces.

Turning now to an overview of the aspects of the invention, one or more embodiments of the invention address the above-described shortcomings of the prior art by providing an abstracted cloud interface that acts as an interface for one or more underlying cloud providers. Some embodiments of the invention are extensible, such that a user can add other cloud providers to those accessible by way of the interface.

The above-described aspects of the invention address the shortcomings of the prior art by enabling a user to access cloud services of multiple cloud providers without having to login for each cloud provider and without having to use a distinct interface for each cloud provider. Because some embodiments of the invention may be integrated into an operating system and may manage authentication data, the use of cloud services may be virtually seamless for the user. Further, using some embodiments of this invention to access multiple cloud providers, a user may avoid installing on a local machine software for accessing multiple cloud providers. As a result, the local machine may run more efficiently, without having to manage local resources needed to communicate with each cloud provider individually.

Turning now to a more detailed description of aspects of the present invention, FIG. 1 is a block diagram of an access system 100 according to embodiments of the invention. As shown in FIG. 1, the access system 100 includes a translator 110, accessible through a primary interface 120, such as an application programming interface (API). The primary interface 120 may define a primary schema by which a user can access cloud resources 130 of one or more cloud providers 140. For example, and not by way of limitation, these cloud resources 130 may include data in cloud storage, remote hardware, or tasks performed remotely. The access system 100 may further include an authentication storage 150, a security interface 160, and an extension unit 170, each of which will be described in more detail below. Each of the translator 110, the authentication storage 150, and the extension unit 170 may include hardware, software, or a combination of both. For example, and not by way of limitation, each of these components may be implemented as a hardware circuit.

The access system 100 may support one or more cloud providers 140, each of which provides cloud resources 130 by way of a native interface 180 associated with that cloud provider 140 and therefore associated with the cloud resources 130 of that cloud provider 140. The native interface 180 of a cloud provider 140 may be the standard or conventional interface, such as an API, used by that cloud provider 140. The native interface 180 may define a native schema of the cloud provider 140, through which one could communicate requests to the cloud provider 140. However, the access system 100 may render this native interface 180 invisible, or virtually so, to the user.

The translator 110 of the access system 100 may communicate information between the primary interface 120 and the native interfaces 180 of the cloud providers 140, thus enabling a user to access the cloud resources 130 through the primary interface 120. For instance, when a user inputs a request to the access system 100 using the primary interface 120, according to the primary schema, the translator 110 may convert the request into a translated request that uses a native interface 180, according to a native schema, of a cloud provider 140. The translator 110 may submit the translated request to the cloud provider 140. The cloud provider 140 may perform one or more necessary tasks responsive to the request, and may provide a response to the translated request. The response may comply with the native interface 180 of the cloud provider 140. In some embodiments of the invention, if needed, the translator 110 may convert the response into a translated response that is in accordance with the primary interface 120. The access system 100 may then return the response, translated as needed, to the user. These operations will be described in more detail later in this disclosure.

The primary interface 120 may define the primary schema useable to access the cloud resources 130. For example, and not by way of limitation, the following access methods or similar access method may be defined by the primary interface 120 and thus useable by a user to access the cloud resources 130:

DELETEOBJECT: delete a specified cloud resource 130, such as a directory or file, from the cloud storage of a specified cloud provider 140;

GETOBJECT: retrieve a specified cloud resource 130 from the cloud storage of a specified cloud provider 140;

LISTOBJECTS: list cloud resources 130 available from all or specified cloud providers 140;

WRITEOBJECT: write a cloud resource 130 to the cloud storage of a specified cloud provider 140; and GETPROVIDERS: get a list of cloud providers 140 currently supported by the access system 100.

In some embodiments, the access system 100 includes the authentication storage 150, which may maintain authentication data required to authenticate one or more users to the one or more cloud providers 140. For instance, the authentication storage 150 may be in the form of one or more files, databases, or keystores. For example, each user may be associated with a respective file, database, or keystore, in which authentication data for that user is stored. Authentication data may include, for example, a user name, a password, a personal identification number, a secret key, biometric data, or a combination of these and other data. The authentication storage 150 may include, for each user, one or more authentication entries, where each authentication entry corresponds to a set of one or more cloud resources 130. Each authentication entry may include authentication data required to authenticate a corresponding user to the cloud provider 140 of the set of cloud resources 130 with sufficient specificity to enable access to the set of cloud resources 130. For example, a cloud provider 140 may require a first authentication for access to a first set of cloud resources 130 available to an entire organization, and the cloud provider 140 may require a second authentication for access to a second set of cloud resources 130 available to only executives of that organization. In that case, the authentication storage 150 may include a first authentication entry that provides a user's authentication data for the first set of resources and a second authentication entry that a provides a user's authentication data for the second set of cloud resources 130.

In some embodiments, in addition to the primary interface 120, the access system 100 further includes the security interface 160. The security interface 160 may define a security schema, a formal language by which the user can save authentication data in the authentication storage 150, authenticate himself or herself to the cloud providers 140, or both. The various cloud providers 140 may vary in the type of authentication they require. The security schema may enable the user to provide these various forms of authentication to the access system 100, thereby enabling the access system 100 to automatically authenticate the user to the cloud providers 140 as needed. In some embodiments, the access system 100 securely stores the user's authentication data in the authentication storage 150, such that the user need not reenter the authentication data every time the user seeks to access cloud resources 130.

For example, and not by way of limitation, the following security methods or similar security method may be defined by the security interface 160 and thus useable by a user to store and access authentication data:

ADDKEY: add to the authentication storage 150 an authentication entry for a cloud resource 130;

DELETEKEY: delete from the authentication storage 150 an authentication entry for a cloud resource 130;

GETRESOURCES: get a list of cloud resources 130 corresponding to a specified authentication entry of the authentication storage 150; and SEARCH: get the most specific authentication entry for a specified cloud resource 130.

In some embodiments, each cloud resource 130 accessible through the access system 100 may be associated with zero, one, or more authentication entries in the authentication storage 150. Generally, when performing a search, such as in response to the SEARCH method, the access system 100 may identify the authentication entry that is most specific to the cloud resource 130 specified in the search request. For instance, access to a first cloud resource 130 provided by a first cloud provider 140 may require only general authentication to the cloud provider 140, while access to a second cloud resource 130 provided by the first cloud provider 140 may require a further authentication that is specific to a subset of the cloud resources 130 of the first cloud provider 140. In that case, performing a search for an authentication entry corresponding to the first cloud resource 130 may return an authentication entry referencing this further authentication step.

In some embodiments of the invention, the access system 100 is installed on, or otherwise integrated with, a computer system 300. For example, and not by way of limitation, the access system 100 may be integrated with an operating system of the computer system 300, such that the computer system 300 presents cloud resources to the user in the same manner or a similar manner in which local resources are presented. For instance, if locally stored files appear as icons displayed in a window, such that double-clicking an icon opens a corresponding file, then files stored remotely by a cloud provider may also appear as icons displayed in a window, such that double-clicking an icon opens a corresponding file that is stored remotely. In other words, some operations of the access system 100 may be performed in the background out of the user's view. One of skill in the art will understand how to implement this background functionality, based on this disclosure.

In some embodiments of the invention, each cloud provider 140 may be added to the access system 100 by way of a description file 190, which may be in JavaScript Object Notation (JSON), for example. A cloud provider 140 may be added to the access system 100 either during installation or later by a user, thereby making that cloud provider 140 accessible through the primary interface 120. In some embodiments, the ability to add cloud providers 140 to the access system 100 by the user after installation makes the access system 100 extensible. JSON, among other notations, is particularly useful for this purpose as it is human-readable, and it is therefore relatively simple for a user to create a description file 190 associated with the cloud provider 140 to be added to the access system 100.

A new cloud provider, to be added to the access system 100, may be associated with a corresponding description file 190 that describes the cloud provider's native interface 180, which may define a native access schema and, optionally, a native security schema. Specifically, in some embodiments of the invention, the description file 190 maps each of the access methods and security methods of the primary interface 120 to a corresponding set of native methods in the native interface 180, where that set of native methods may be specified in a series. This mapping may describe which native methods to call with which parameters, and in which order, if applicable, when a user calls an access method or security method of the primary interface 120. In other words, the description file 190 may define each access method and each security method of the primary interface 120 in terms of one or more native methods of the native interface 180. As a result, the description file 190 may describe how the translator 110 can translate between the primary interface 120 and the native interface 180 of the new cloud provider 140. Further, in some embodiments of the invention, the description file 190 may also describe how to translate responses of the native interface 180 into responses of the primary interface 120, such that responses may be translated properly as well.

From the description file 190, the access system 100 may extract this information about the native interface 180. To this end, the extension unit 170 of the access system 100 may read, or analyze, the description file 190. Based on the description file 190, the extension unit 170 may notify the translator 110 of how to translate the access methods of primary interface 120 and the security methods of the security interface 160 into native methods according to the native interface 180 of the cloud provider 140. In some embodiments of the invention, the extension unit 170 may store information of the description file 190 in a manner accessible to the translator 110, or the extension unit 170 may simply notify the translator 110 of the description file 190 such that the translator 110 can extract the necessary information while performing translations. Thus, when a user calls one of the access methods or security methods of the primary interface 120 when trying to access the new cloud provider 140, the access system 100 may know which parameters to use and which native methods of the native interface 180 of the cloud provider 140 to use to complete the user's request.

Additionally, when adding a new cloud provider 140, the access system 100 may ask the user to authenticate himself to the new cloud provider 140, or to provide authentication data for later authentication. Upon receiving this authentication data, the access system 100 may store this authentication data in the authentication storage 150 for later use.

Figure 2:
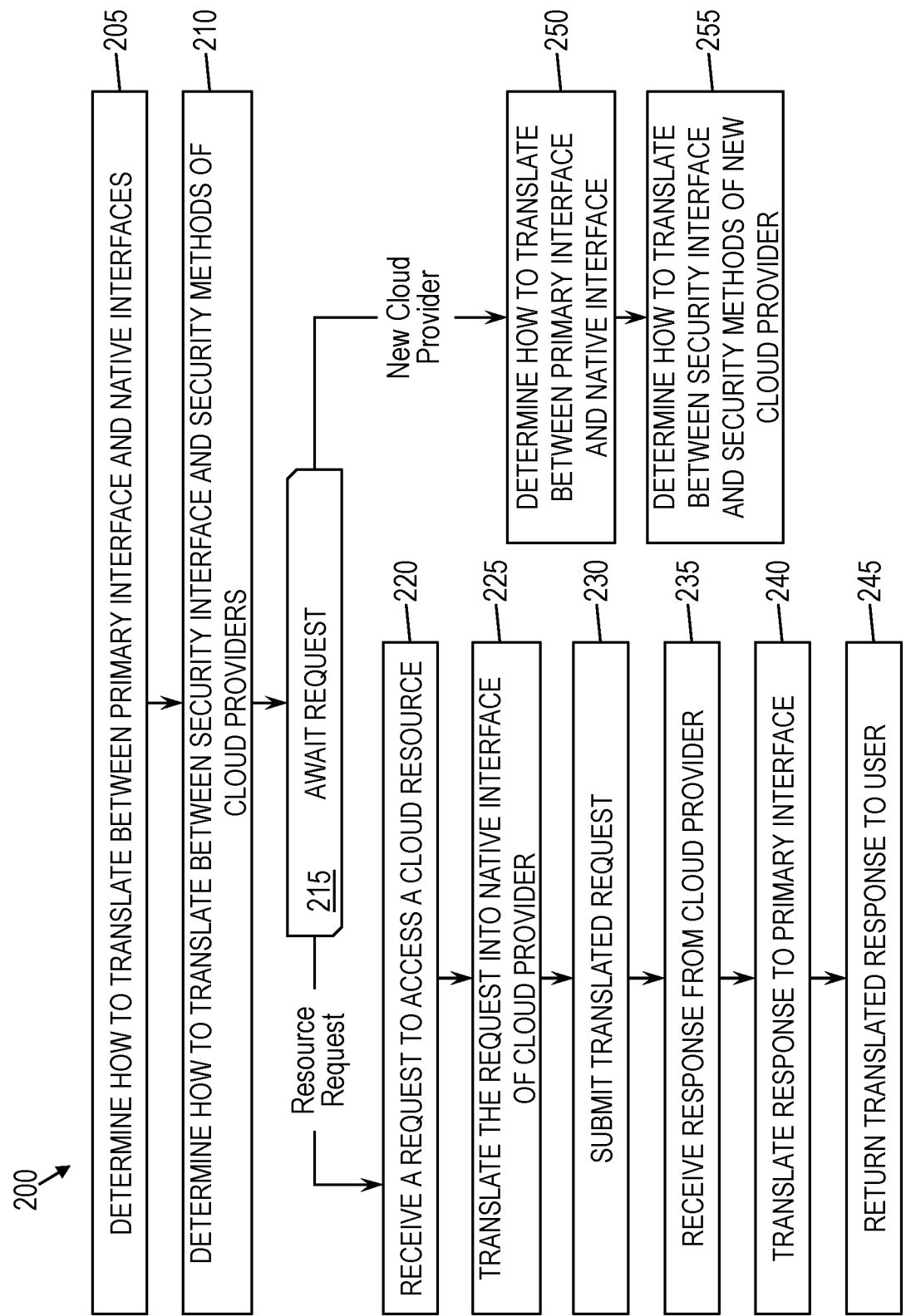
FIG. 2 is a flow diagram of a method for accessing a resource through the access system, according to some embodiments of this invention.

FIG. 2 is a flow diagram of a method 200 for accessing a cloud resource 130 through the access system 100, according to some embodiments of this invention.

At blocks 205 and 210, the access system 100 is initialized, such as through installation. This initialization may include integrating one or more cloud providers 140 into the access system 100. Integrating the cloud providers 140 may involve, for each cloud provider, at block 205, reading a description file 190 and as a result determining how to translate between the primary schema of the primary interface 120 and the native schema of the corresponding native interface 180 of the cloud provider 140. Integrating the cloud provider may further involve, at block 210, reading a security schema of the cloud provider 140 from the corresponding description file 190 and determining how to translate between the security methods of the security interface 160 and native security methods of the native interface 180 of the cloud provider 140. In some embodiments of the invention, if applicable, authentication information needed to log a user into the cloud provider 140 is stored in the authentication storage 150.

After installation, at decision block 215, the access system 100 may await a request from a user. A request from a user may be, for example, a request for a cloud resource 130 or a request to add a new cloud provider 140 to the access system 100.

If the access system 100 receives a request for a cloud resource 130, then the method 200 may proceed to blocks 220-240, which illustrate the standard use of some embodiments of the access system 100. As shown, at block 220, the access system 100 may receive a request to access a cloud resource 130 of a cloud provider 140 already supported by the access system 100. For example, and not by way of limitation, the request may ask for the performance of a task, such as processing data or provision of access a cloud resource 130, such as a file or directory. The request may use the primary interface 120 and may thus be made in the primary schema. At block 225, the translator 110 may translate the request to the native interface 180 of the cloud provider 140. At block 230, the translator 110 may submit the translated version of the request to the cloud provider 140. The cloud provider 140 may process the translated request and return a response, at block 235. In some cases, processing the request may require the cloud provider 140 to perform one or more tasks on behalf of the user. The response may be, for example, the return of a cloud resource 130 or a confirmation of a task having been performed. At block 240, if needed, the translator 110 may translate the response into a translated response in the primary schema. At block 245, the translator may return the response to the user, translated as needed. The method 200 may then return to block 215 to await a further request.

If, at block 215, the access system 100 receives a request to add a new cloud provider 140, then the method 200 may proceed to blocks 250-255, which illustrate the extensibility of some embodiments of the invention. At block 250, the access system 100 may receive a description file 190 from the user, where the description file 190 describes a native interface 180 of a new cloud provider 140. The description file 190 may have come for various sources. For example, and not by way of limitation, the user or a third party may have prepared the description file 190 based on the knowledge of the new cloud provider 140, or the new cloud provider 140 may have provided the description file 190 to describe its own native interface 180. At block 255, based on the description file 190, the access system 100 may determine how to translate between the primary interface 120 and the native interface 180 of the new cloud provider 140. The description file 190 may also include a native security schema defining native security methods applicable to the cloud provider 140, and at block 255, the access system 100 may determine how to translate between the security schema of the access system 100 and the native security schema of the cloud provider 140. The method 200 may then return to block 215 to await a further request.

Figure 3:
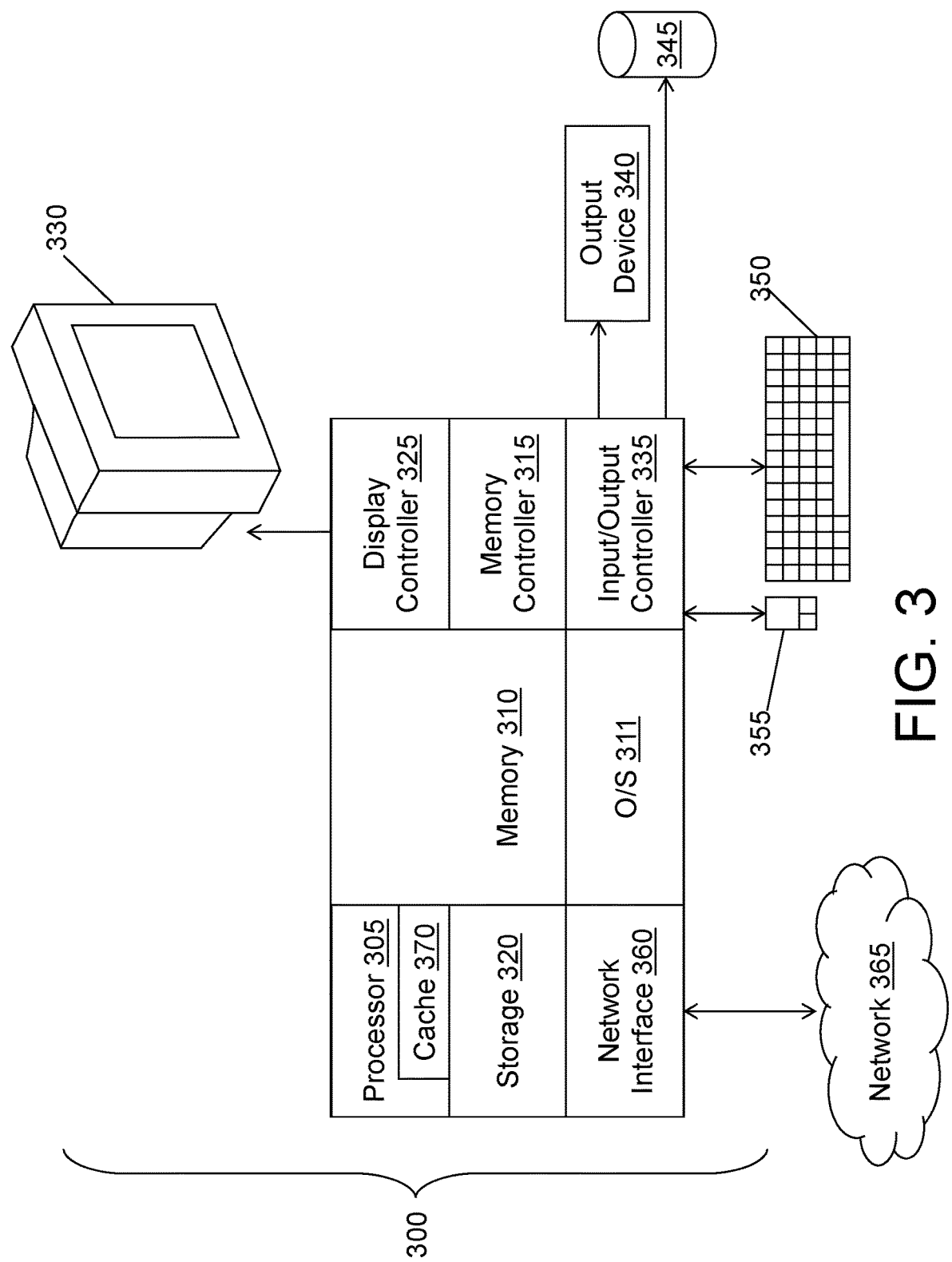
FIG. 3 is a block diagram of a computer system for implementing some or all aspects of the access system, according to some embodiments of this invention.

FIG. 3 illustrates a block diagram of a computer system 300 for use in implementing an access system 100 or method according to some embodiments. The access systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the access systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Access systems 100 and methods according to this disclosure may be embodied, in whole or in part, in computer program products or in computer systems 300, such as that illustrated in FIG. 3.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
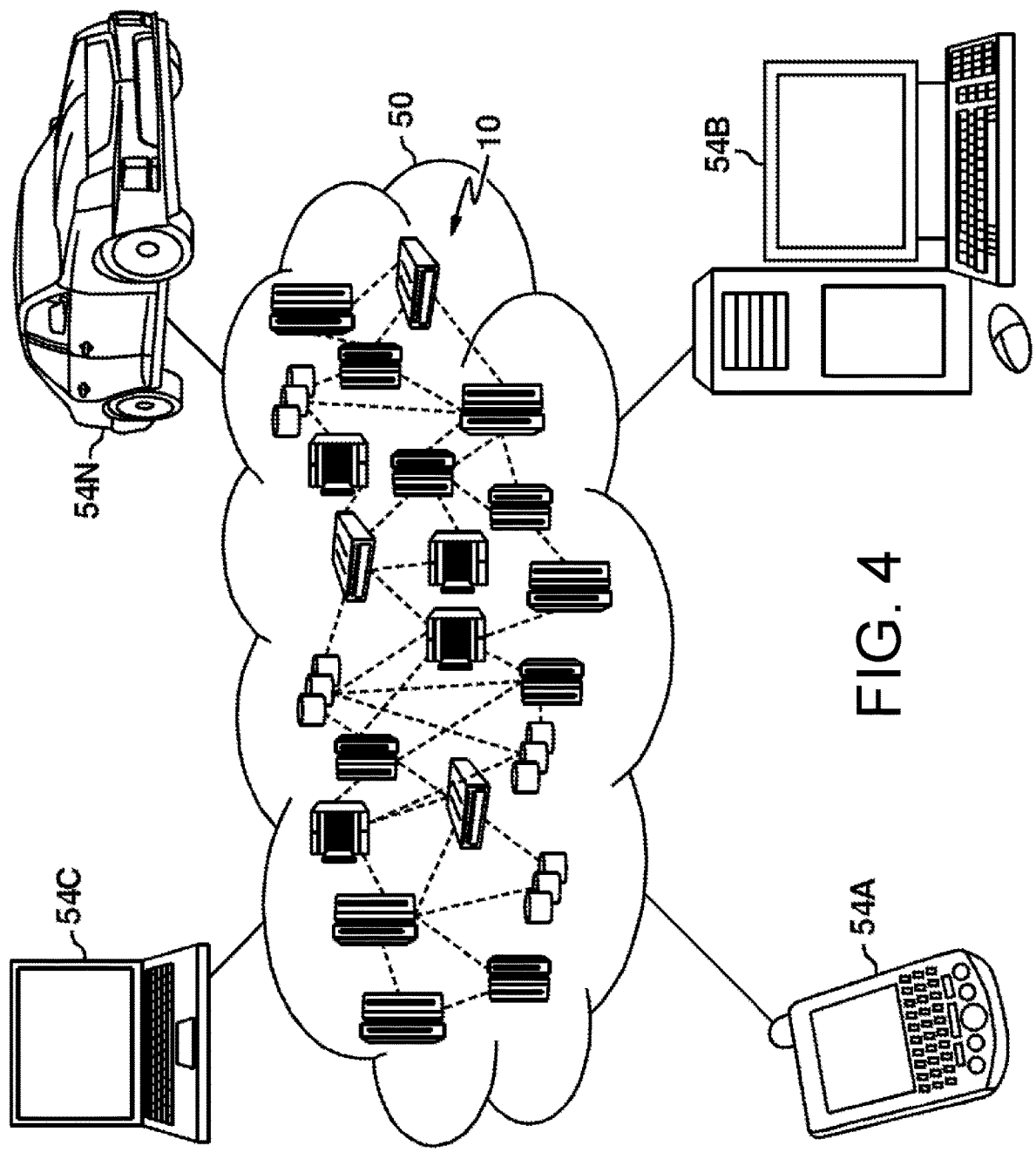
FIG. 4 is a block diagram of a cloud computing environment, according to some embodiments of this invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
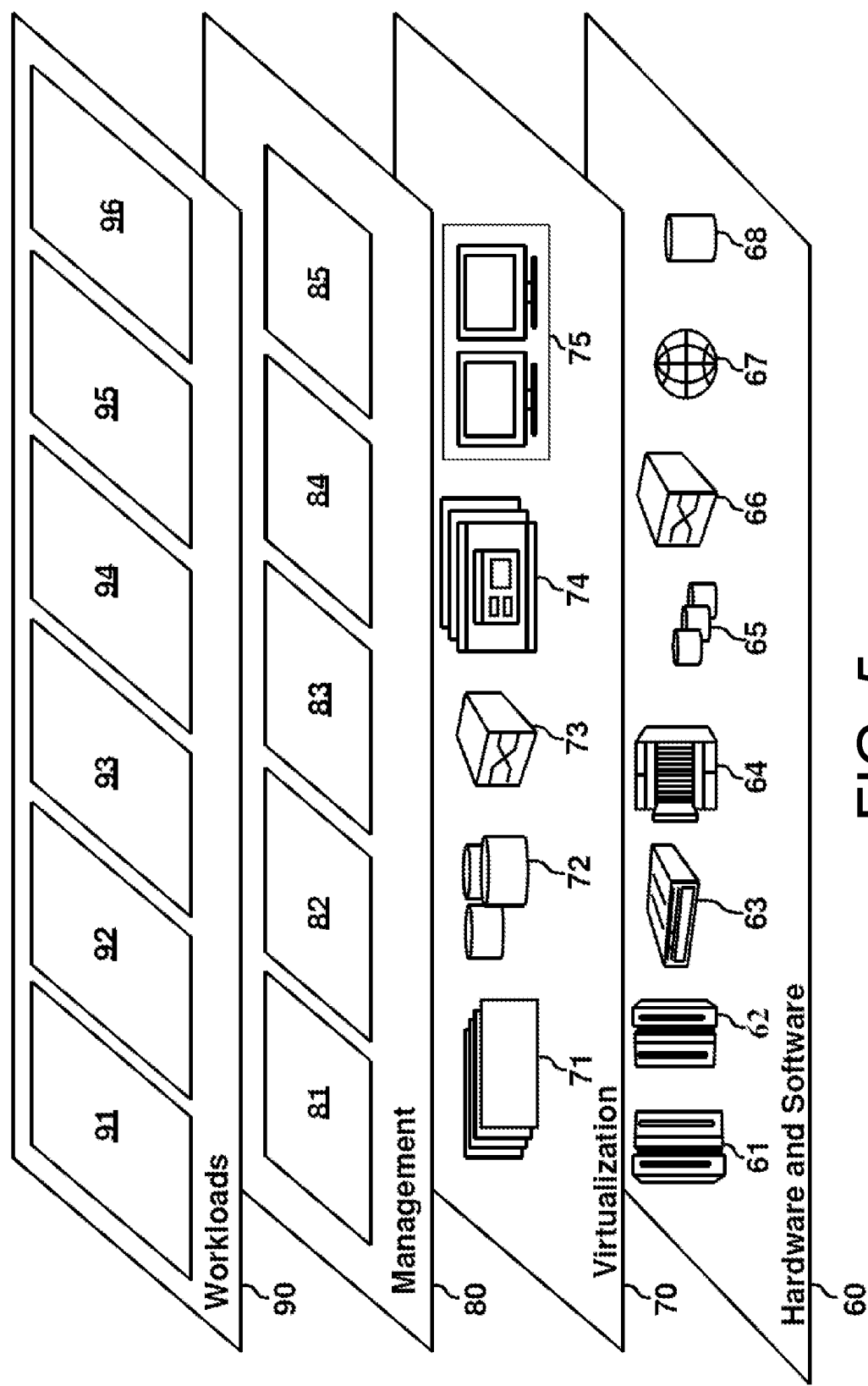
FIG. 5 is a block diagram of abstraction model layers, according to some embodiments of this invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and installing and accessing 96 the cloud providers 140 for use of the access system 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
determining, by a computer processor, how to translate between a primary schema and each of two or more native schemas of two or more cloud providers, wherein the primary schema defines one or more access methods for accessing a plurality of cloud resources of the two or more cloud providers;
receiving a request for a first cloud resource of the plurality of cloud resources, wherein the first cloud resource is provided remotely by a first cloud provider of the two or more cloud providers, and wherein the request complies with the primary schema;
converting the request into a translated request in compliance with a first native schema of the first cloud provider;
submitting the translated request to the first cloud provider;
receiving a response from the first cloud provider, wherein the response comprises a cloud resource of the plurality of resources, and wherein the response complies with the first native schema of the cloud provider;
returning the response;
authenticating a user for access to the first resource, wherein the authenticating the user comprises:
maintaining an authentication storage comprising a plurality of authentication entries, wherein each authentication entry of the plurality of authentication entries comprises authentication data required to authenticate the user for access to
identifying a first authentication entry of the authentication storage, wherein the first authentication entry is more specific to the first resource when compared to another authentication entry in the plurality of authentication entries; and
submitting, to the first cloud provider, authentication data of the first authentication entry; and
adding, by the computer processor, a new cloud provider to the two or more cloud providers, the adding comprising:
analyzing a description file that maps access and security methods of the primary schema to a corresponding set of methods in a new native schema of the new cloud provider;
determining, based at least in part on the analyzing, how to translate between the primary schema and the new native schema of the new cloud provider; and
determining, based at least in part on the analyzing, how to translate between a security method of a security interface of the primary schema and a new native security method of the new native schema,
wherein the security method of the security interface of the primary schema comprises a method for storing and accessing an authentication entry for a cloud resource of the new cloud provider that describes a type of authentication required to access the cloud resource of the new cloud provider.

2. The computer-implemented method of claim 1, wherein the description file defines each access method of the primary schema in terms of the one or more access methods of the new cloud provider.

3. The computer-implemented method of claim 1, wherein the receiving the response from the cloud provider comprises receiving confirmation of remote performance of a task.

4. The computer-implemented method of claim 1, further comprising authenticating a user for access to the first resource, wherein the authenticating the user comprises:
maintaining an authentication storage comprising a plurality of authentication entries, wherein each authentication entry of the plurality of authentication entries comprises authentication data required to authenticate the user for access to a corresponding set of cloud resources of the plurality of cloud resources;
identifying a first authentication entry of the authentication storage, wherein the first authentication entry corresponds to the first resource; and
submitting, to the first cloud provider, authentication data of the first authentication entry.

5. The computer-implemented method of claim 4, wherein the adding a new cloud provider further comprises:
adding a new authentication entry to the authentication storage, wherein the new authentication entry comprises authentication data required to authenticate the user for access to a new set of cloud resources of the new cloud provider.

6. A system comprising:
a memory having computer-readable instructions; and
one or more processors for executing the computer-readable instructions, the computer-readable instructions comprising:
determining how to translate between a primary schema and each of two or more native schemas of two or more cloud providers, wherein the primary schema defines access methods for accessing a plurality of cloud resources of the two or more cloud providers;
receiving a request for a first cloud resource of the plurality of cloud resources, wherein the first cloud resource is provided remotely by a first cloud provider of the two or more cloud providers, and wherein the request complies with the primary schema;
converting the request into a translated request in compliance with a first native schema of the first cloud provider;
submitting the translated request to the first cloud provider;
receiving a response from the first cloud provider, wherein the response comprises a cloud resource of the plurality of resources, and wherein the response complies with the first native schema of the cloud provider;
returning the response; and
authenticating a user for access to the first resource, wherein the authenticating the user comprises:
maintaining an authentication storage comprising a plurality of authentication entries, wherein each authentication entry of the plurality of authentication entries comprises authentication data required to authenticate the resources,
identifying a first authentication entry of the authentication storage, wherein the first authentication entry is more s eat to the first resource when compared to another authentication entry in the plurality of authentication entries; and
submitting, to the first cloud provider, authentication data of the first authentication entry;
adding a new cloud provider to the two or more cloud providers, the adding comprising:
analyzing a description the that maps access and security methods of the primary schema to a corresponding set of methods in a new native schema of the new cloud provider;

determining, based at least in part on the analyzing, how to translate between the primary schema and the new native schema of the new cloud provider; and determining, based at least in part on the analyzing, how to translate between a security method of a security interface of the primary schema and a new native security method of the new native schema, wherein the security method of the security interface of the primary schema comprises a method for storing and accessing an authentication entry for a cloud resource of the new cloud provider that describes a type of authentication required to access the cloud resource of the new cloud provider.

7. The system of claim 6, wherein the description the defines each access method of the primary schema in terms of the one or more access methods of the new cloud provider.

8. The system of claim 6, wherein the receiving the response from the cloud provider comprises receiving confirmation of remote performance of a task.

9. The system of claim 6, wherein the computer-readable instructions further comprise authenticating a user for access to the first resource, and wherein the authenticating the user comprises:

maintaining an authentication storage comprising a plurality of authentication entries, wherein each authentication entry of the plurality of authentication entries comprises authentication data required to authenticate the user for access to a corresponding set of cloud resources of the plurality of cloud resources;

identifying a first authentication entry of the authentication storage, wherein the first authentication entry corresponds to the first resource; and submitting, to the first cloud provider, authentication data of the first authentication entry.

10. The system of claim 9, wherein the adding a new cloud provider further comprises:

adding a new authentication entry to the authentication storage, wherein the new authentication entry comprises authentication data required to authenticate the user for access to a new set of cloud resources of the new cloud provider.

11. A computer-program product for accessing cloud resources, the computer-program product comprising a computer-readable storage medium having program instructions embodied therewith, the program instructions executable by a processor to cause the processor to perform a method comprising:

determining how to translate between a primary schema and each of two or more native schemas of two or more cloud providers, wherein the primary schema defines access methods for accessing a plurality of cloud resources of the two or more cloud providers;

receiving a request for a first cloud resource of the plurality of cloud resources, wherein the first cloud resource is provided remotely by a first cloud provider of the two or more cloud providers, and wherein the request complies with the primary schema;

converting the request into a translated request in compliance with a first native schema of the first cloud provider;

submitting the translated request to the first cloud provider;

receiving a response from the first cloud provider, wherein the response comprises a cloud resource of the plurality of resources, and wherein the response complies with the first native schema of the cloud provider;

returning the response; and authenticating a user for access to the first resource, wherein the authenticating the user comprises:

maintaining an authentication storage comprising a plurality of authentication entries comprises authentication data required to authenticate the user for access to a corresponding set of cloud resources of the plurality of cloud resources;

identifying a first authentication entry of the authentication storage, wherein the first authentication entry is more specific to the first resource when compared t another authentication entry in the plurality if authentication entries; and submitting, to the first cloud provider, authentication data of the first authentication entry;

adding a new cloud provider to the two or more cloud providers, the adding comprising:

analyzing a description the that maps access and security methods of the primary schema to a corresponding set of methods in a new native schema of the new cloud provider;

determining, based at least in part on the analyzing, how to translate between the primary schema and the new native schema of the new cloud provider; and determining, based at least in part on the analyzing, how to translate between a security method of a security interface of the primary schema and a new native security method of the new native schema, wherein the security method of the security interface of the primary schema comprises a method for storing and accessing an authentication entry for a cloud resource of the new cloud provider that describes a type of authentication required to access the cloud resource of the new cloud provider.

12. The computer-program product of claim 11, wherein the description file defines each access method of the primary schema in terms of the one or more access methods of the new cloud provider.

13. The computer-program product of claim 11, wherein the receiving the response from the cloud provider comprises receiving confirmation of remote performance of a task.

* * * * *